Figure 1:
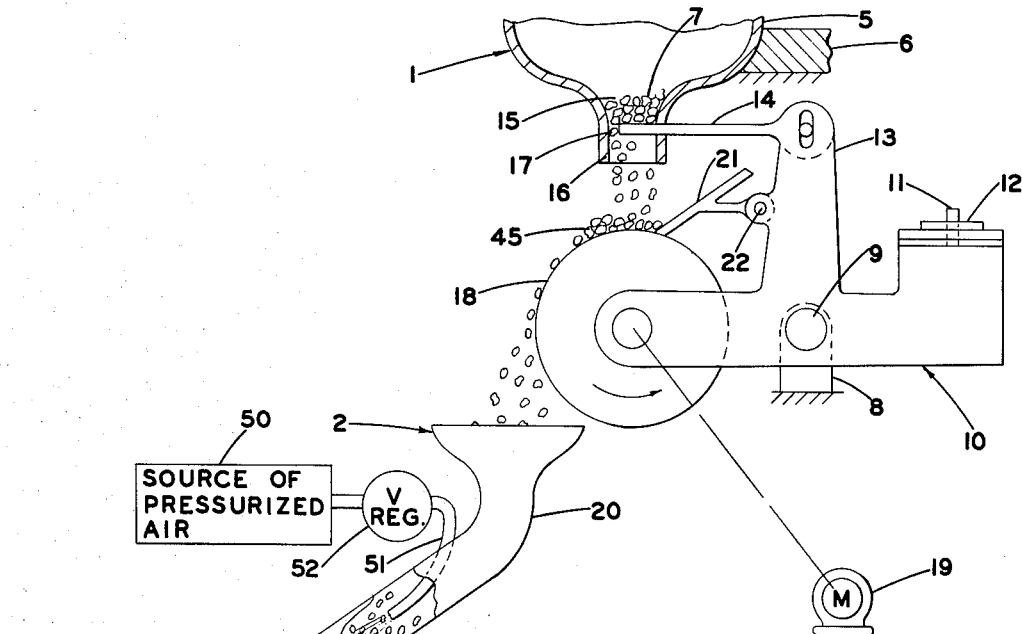

April 5, 1966    J. M. APPLE ETAL    3,244,494
METHOD OF FEEDING TO AND MELTING IN A GLASS FURNACE
Filed July 2, 1962

JOHN M. APPLE
JACK A. COOMBS
INVENTORS

BY *Arthur R. Nelson*
*Frank C. Parker*
ATTORNEYS

> 3,244,494
> METHOD OF FEEDING TO AND MELTING IN A
> GLASS FURNACE
> John M. Apple, Henrietta, and Jack A. Coombs, Rochester, N.Y., assignors to Bausch & Lomb Incorporated, Rochester, N.Y., a corporation of New York
> Filed July 2, 1962, Ser. No. 206,657
> 3 Claims. (Cl. 65—136)

This invention relates to a glass furnace and more particularly to a means for feeding and distributing the raw batch into a glass furnace for controlled melting.

The conventional glass furnace is usually a large installation having intermittent charging operations of large quantities of the raw glass batch. Intermittent feeding of a large charge causes an agglomeration of raw batch and molten glass which cools the glass surrounding the cold raw batch constituents which are being charged thereby causing the agglomeration to sink to the bottom of the furnace. This type of feeding can be tolerated where the melting process is extended over a considerable length of time and a suitable arrangement is provided such as a submerged dam preventing partially melting constituents from passing into the fining chamber.

A continuous flow glass furnace having an arrangement for controlling the rate of feed and melting permits a substantial reduction in the size of the glass furnace installation and yet maintains a flow of quality glass through the furnace. This may be accomplished by maintaining a sufficiently high temperature for continuous melting of the raw batch constituents upon distribution on the surface of the molten glass in a uniform manner such that no agglomeration is formed of sufficient magnitude to cause an appreciable penetration of the molten glass body. The feed arrangement may be accomplished through a feeder which feeds at a rate equal to a predetermined exit flow from the glass furnace. Accordingly this invention is intended to provide such an arrangement whereby a weigh feeder feeds the raw batch into a transfer and distribution mechanism which distributes the raw batch constituents on the surface of a molten glass body having a predetermined controlled temperature to melt the raw batch before any appreciable penetration into the molten glass body of the melting chamber is permitted.

It is an object of this invention to provide a metered feed arrangement associated with a glass furnace feeding at a predetermined rate coordinated with the flow in a continuous flow furnace.

It is another object of this invention to provide a feed and distribution means associated with a glass furnace to control the rate of feed such that no agglomeration of batch is present in the glass melting chamber of the furnace.

It is a further object of this invention to provide a continuous feed and even distribution means for a glass furnace and to control the rate of melting to provide continuous flow of molten glass through a glass furnace.

It is a further object of this invention to provide metered feed and distribution of pellets formed of raw batch in and to simultaneously control the rate of melting for prevention of any agglomerations in the molten glass, or appreciable penetration of the surface of molten glass in the melting chamber of a glass furnace.

It is a further object to provide a method of feeding a continuous flow glass furnace.

The objects of this invention are accomplished by providing a weigh feeder controlling the rate of discharge from a supply chamber of raw batch. The raw batch has evenly proportioned mixture of the constituents to be charged in a glass furnace. The glass forming material might be in cullet form, or sintered glass forming material. The preferred form although not limited to this form is a device adapted for feeding pellets from the supply chamber. The pellets are previously pelletized to form evenly distributed constituents of all the components required in the raw batch and pelletized to form the most desirable size of pellets. The weigh feeder feeds the raw batch at a rate which is predetermined by the rate of flow of glass through the furnace and may be set as desired by the operator of the glass furnace. The weigh feeder feeds the glass into a transfer and distribution mechanism. The raw batch is distributed on the surface of the molten glass in the melting chamber. The glass is distributed on the surface at a rate which is not sufficient to cause agglomeration of the raw batch as it is deposited on the surface of the molten glass. The distribution device might be any suitable transfer mechanism such as a conveyor with means for evenly distributing the raw batch on the molten glass surface.

The melting chamber is automatically controlled to provide the desired temperature and rate of melting according to the rate of flow to the glass furnace. Substantially no raw batch ever penetrates beyond the proximity of the surface of the molten glass.

The specific nature of this invention as well as other objects and advantages thereof will become apparent to those skilled in the art in the following detailed description taken in conjunction with the annexed drawings which illustrate a preferred embodiment of this invention.

Figure 2:
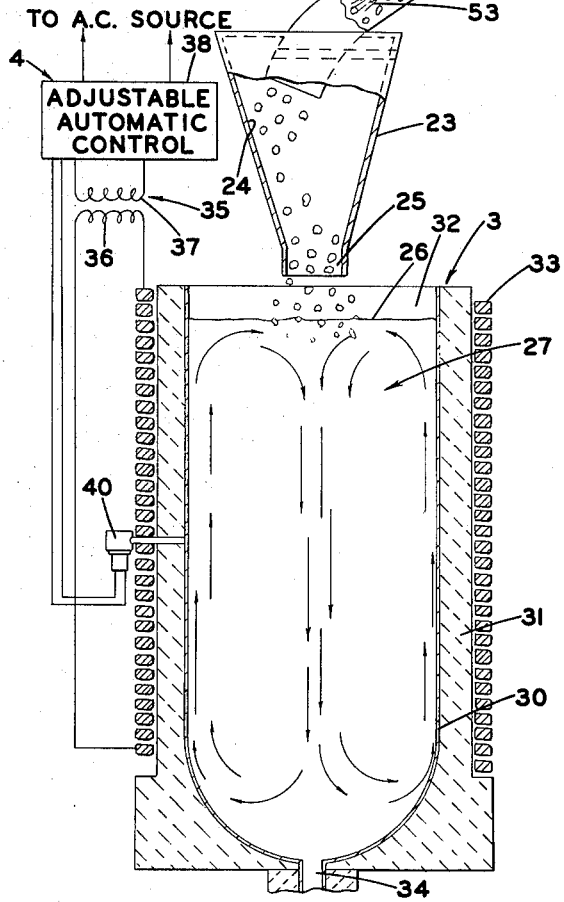

FIG. 1 illustrates a weigh feeder feeding raw batch constituents from a storage chamber to a transfer and distribution device into a heat controlled melting chamber of a glass furnace, and FIG. 2 is an enlarged fragmentary cross section view of FIG. 1 illustrating the melting action present within the melting chamber.

The conventional glass furnace is a large installation requiring considerable time in change-over between various runs. Due to the large size of the installation a considerable initial investment is required and also a considerable quantity of glass is run through the furnace before a quality glass suitable for ophthalmic lenses is delivered. The size of installation and change-over time may be substantially reduced through controlling the rate and distribtuion of feed and the melting in the glass furnaces.

The feeding arrangement as illustrated includes a suitable weigh feeder which is set in accordance with a predetermined rate of flow through the glass furnace. A suitable distribution means evenly distributing the raw batch on the surface of the molten glass in the melting chamber. The melting chamber however must be accurately controlled with regard to the temperature to maintain a continuous melting and prevent any partially melted portions of the raw batch from passing from the melting chamber prior to melting. Degassing in a glass furnace also presents a problem particularly where the size of the furnace and the time required for flow through the furnace is substantially reduced. This can be overcome through the controlled feeding and melting arrangement as set forth in this invention. The raw batch constituents are deposited in a random manner on the surface of the molten glass.

The principle of formation of bubbles requires that a discontinuity within the fluid body be present to permit formation of the bubble. The reason being that the surface tension is so great that a bubble cannot form unless a nucleus is present within the liquid. The principle of formation of bubbles requires that a source be present within the fluid to sufficiently reduce surface tension permitting the formation of the minute bubble. The raw batch constituents randomly distributed on the surface provide the necessary break in the molten mass for the formation of a minute bubble. Once the bubble is formed it can rapidly expand in size until it pierces the surface and is released.

A sufficiently high temperature and low viscosity of the molten glass permits the bubble to expand rapidly and rise to the surface. The rapid melting of the flux and dissolving of the glass forming oxides causes the bubble to grow rapidly in size as the gas is formed from the melting raw batch constituents. Upon complete dissolution of the raw batch grain the bubble is released and permitted to rise due to the differential pressure acting on the bubble.

The pellet which is deposited on the surface and then rapidly melted provides a dual function by breaking the surface tension to permit formation of the bubble and then releasing the bubble and allowing it to rise to the surface as the pellet is completely dissolved. Through the controlled feed, distribution, and melting any rate of flow through the glass furnace may be designed to accommodate the desired rate of flow of quality glass. With a rapid degassing of the molten glass the glass can now move into the conditioning chamber.

Referring to the drawings, FIG. 1 illustrates the weigh feeder 1 which automatically controls the rate of feed according to a pre-set rate of flow desired through the glass furnace. The weigh feeder feeds into a transfer and distribution device 2 which is schematically illustrated intermediate the weigh feeder and the melting pot 3. The melting pot 3 as illustrated employs an induction heating system 4 for providing the necessary controlled heat for the melting in the melting chamber.

A supply reservoir 5 is mounted on a support 6 and contains a supply of pellets 7 to be fed through the weigh feeder. The weigh feeder as illustrated is pivotally supported on a fixed support 8 on the pivoting pin 9. The frame 10 is formed with a peg 11 for receiving a plurality of weights 12. The number of weights 12 which are stacked on the peg 11 depends on the rate of flow which is desired in the glass furnace.

The arm 13 is formed integral with the frame 10 and extends upwardly where it pivotally connects the valve element 14 extending through the valve opening 15 formed by the valve housing 16. A gravity feed is utilized in this valve arrangement causing a flow of the pellets 7 through the valve opening 15 in accordance with the clearance 17 provided by the valve element 14. The pellet 7 passes through the valve housing 16 and are deposited on the upper surface of the drum 18. The drum 18 is rotatably supported on the frame 10 and driven by the motor 19 at a predetermined rate. The drum 18 rotates to cause the pellets to rotate forwardly and fall within a conduit 20. Any reverse flow of the pellets is prevented by the guide 21 which slidingly engage the drum 18 and is pivotally connected to the arm 13 by the pin 22.

A transfer mechanism includes the conduit 20 which is flared on its upper end to receive pellets from the rotating drum 18 of the weigh device. The conduit feeds into the funnel 23 which is positioned immediately below the conduit 20.

A source of pressurized air 50 is connected to the tube 51 through the pressure regulator 52. The tube 51 is inserted within the conduit 20 and imparts a velocity to the pellets to increase the area of distribution as well as the evenness of distribution as the pellets emerge from the funnel 23. The pressure of the air feeding into the conduit 20 may be controlled to provide the proper velocity for spreading of the pellets as they emerge from the funnel 23. It is noted that the air emerges from the lower end of the funnel 23 as the upper end is closed. The velocity and pressure of the air is low at the opening of the funnel and no appreciable cooling effect on the melting surface is created.

The pellets passing through the conduits 20 impinge on the surface 24 in the funnel 23 and distribute randomly and evenly as they pass through the opening 25. The pellets distribute themselves on the surface 26 of the molten glass 27. The transfer and distribution means 2 might be any suitable device which transfers the pellets from the supply reservoir to a point where they are evenly distributed on the surface of the molten glass 27. It is not imperative that the distribution is random but primarily that the distribution be relatively even on the surface such that the melting of the pellets is even and rapid.

The melting chamber 32 is formed by a platinum liner 30 on the inner surface of a refractory 31 such as an Alundum layer. An induction coil 23 surrounds the melting pot 3. An orifice 34 controls the rate of exit from the melting chamber 27.

The induction coil 33 is electrically connected to a source of electrical energy. For the purpose of illustration a transformer 35 is shown with its secondary winding 36 connected to the induction coil 33. The primary winding 37 is connected through an automatic control 38 to a source of alternating current. The automatic control 38 is also connected through a heat sensing device 40 positioned to sense the degree of heat of molten glass 27 within the chamber 32. The heat sensor 40 automatically controls the rate of flow of electrical energy from the source of alternating current to the induction coil 33. In this manner a constant temperature is maintained in the melting chamber 32.

FIG. 2 illustrates an enlarged cross section view of the melting chamber 32. The inner liner 30 is shown adjacent to the molten body 27 in the melting chamber. Convection currents are set up in the molten glass causing a rising current about the inner periphery of the liner 30 which flows downwardly in the center of the melting chamber. The rate of flow however is slow and is not sufficient to cause any unmelted raw batch to move any appreciable distance from the surface 26 of the molten glass 27.

Operation of the device will be described in the following paragraphs. The feeder 1 automatically controls the rate of feed of the pellet 7 from the supply reservoir 5 at a rate determined by the weights 12 supported by the frame 10. The drum 18 is continuously rotating in response to the motor 19 and drops the pellets in the flared portion of the conduit 20. The weight of the pellets 45 lying on the upper surface of the drum 18 counterbalances the weights 12 on the frame 10. When an equilibrium is reached the valve element 14 extending into the valve opening 15 provides the desired rate of discharge of the pellets 7 through the clearance 17. Any suitable feed arrangement could be provided so long as the rate of feed can be accurately controlled according to a predetermined flow rate through the glass furnace.

For the purpose of illustration the pellets are used in the automatic weigh device because they can be formed to flow more readily and each pellet includes an even distribution of the glass forming constituents necessary in the raw batch.

The transfer and distribution device 2 include a conduit 20 and a funnel 23. The conduit 22 is flared to receive the pellets as they are rolled from the surface of the drum 18. The pellets are then conveyed to the funnel 23 and accelerated by the air jet 53 where they impinge on the surface 24 and distribute themselves randomly in the funnel 23. As the pellets fall through the opening 25 of the funnel 23 they evenly distribute themselves on the surface 26 of the molten glass 27 in the melting chamber. As the pellets are evenly distributed on the surface they have a tendency to be buoyed upwardly due to the surface tension of the molten glass 27 and also due to the fact that a certain amount of air is entrained in the pellets which makes them considerably lighter than the melted raw batch. The molten glass 27 is maintained at a predetermined temperature of approximately 2600° F. which provides sufficient heat to reduce viscosity and maintain adequate dissolution of the pellets as they are deposited on the surface. The temperature of 2600° F. is mentioned merely for illustration and is not a limitation as this temperature would vary depending on the composition of the glass.

The induction coil 33 is connected to the transformer 35. The automatic control 38 is controlled through a heat sensing element 40 to control the rate of flow of electrical energy from alternating current source through the transformer 35. The temperature can be automatically controlled by the control means to insure uniform heating and melting in the melting chamber 32. The induction coil 33 sets up eddy currents in the molten glass 27 causing the heating of the molten glass. The metallic liner 30 also provides considerable heating due to eddy currents set up in the liner. The molten glass is a conductor of heat therefore heats through conduction as well as convection currents. The pellet distribution on the surface of molten glass 27 is controlled to prevent any agglomeration of pellets which may sink in the molten glass and cause partially melted raw batch to be discharged from the melting pot 3. The heat of the molten glass rapidly dissolves the flux and causes the melting of the glass forming oxides in the raw batch. As indicated previously bubbles are formed on the pellets by entrained gas in the pellets as well as formations from the composition of the raw batch due to heating. The bubbles rapidly enlarge as the size of the pellet is reduced due to melting. Upon complete dissolving and melting of the pellet the gas is allowed to rise and be released from the surface of the molten glass 27.

The heating of the peripheral walls of the melting pot 3 causes a convection current upwardly on the outer periphery and to flow downwardly in the center of the pot. The convection current serves to equalize temperatures throughout the mass of molten glass. The rate of flow is slow enough to not cause unmelted raw batch to descend any appreciable distance in the mass of molten glass. The rate of flow is also sufficiently slow so that the upward movement of the gas formed on the pellets is greater than the movement of the convection current in the center so that the gas may be released from the surface of the molten glass. The rate of flow of the convection currents is determined by the dimensions of the melting pot and the temperature and viscosity of the molten glass. With the present design for the control of raw batch feed, distribution, and melting it is possible to very substantially reduce the overall size of the glass furnace and still retain the basic requirements for the quality ophthalmic lens. With this type of operation degassing of the melted glass which normally takes hours is reduced to minutes and even seconds if the proper control is provided for feeding distribution and melting.

It is apparent that modifications might be made which fall within the scope of the invention and that the present disclosure is not limiting but illustrative only. The invention set forth above is covered in the following claims.

We claim:
1. A method of feeding and melting in a continuous flow glass furnace comprising the following steps, providing a supply of thoroughly mixed constituents of raw batch glass forming material, metering the rate of flow of the glass forming material at a substantially uniform rate from the source of supply, continuously and evenly sprinkling the constituents of glass forming material on the surface of a body of molten glass in the glass furnace, supplying sufficient heat to the body of molten glass for rapidly melting the glass forming material near the surface and preventing any agglomeration of material from forming on the surface of the body of molten glass and thereby provide a melting rate in conformity with the feed rate in a continuous flow glass furnace.

2. A method of feeding and melting in a continuous flow glass furnace comprising the following steps, providing a supply of thoroughly mixed constituents of raw batch glass forming pellets, automatically weighing and discharging the pellets from the supply, continuously and evenly sprinkling and depositing the pellets in separate relationship on the surface of a body of molten glass in the furnace, supplying sufficient heat to the body of molten glass for producing convection currents in the molten glass, and melting the glass forming pellets before they are carried downwardly by the convection currents and thereby providing rapid melting of the pellets in the molten glass.

3. A method of feeding and melting in a continuous flow glass furnace comprising the following steps, providing a supply of thoroughly mixed constituents of raw batch glass forming pellets, discharging the pellets from the supply at a substantially constant rate, continuously and evenly distributing the pellets in separate relationship over a prescribed area on the surface of a body of molten glass in the glass furnace, supplying heat for rapidly melting the pellets near the surface of the body of molten glass, providing a multitude of bubble forming nucleus by the presence of the pellets in the portion of the fluid body adjacent the surface of the body of molten glass to thereby rapidly degas the body of molten glass under minimum pressure conditions.

References Cited by the Examiner

UNITED STATES PATENTS

| 1,908,238 | 5/1933 | Hardinge | 222—55 |
| 2,262,070 | 11/1941 | Turk | 65—347 X |
| 2,465,283 | 3/1949 | Schlehr | 65—335 X |
| 2,495,956 | 1/1950 | Cook | 65—162 X |
| 3,077,094 | 2/1963 | Jack et al. | 65—136 |

HOWARD R. CAINE, *Acting Primary Examiner.*

DONALL H. SYLVESTER, *Examiner.*